United States Patent Office.

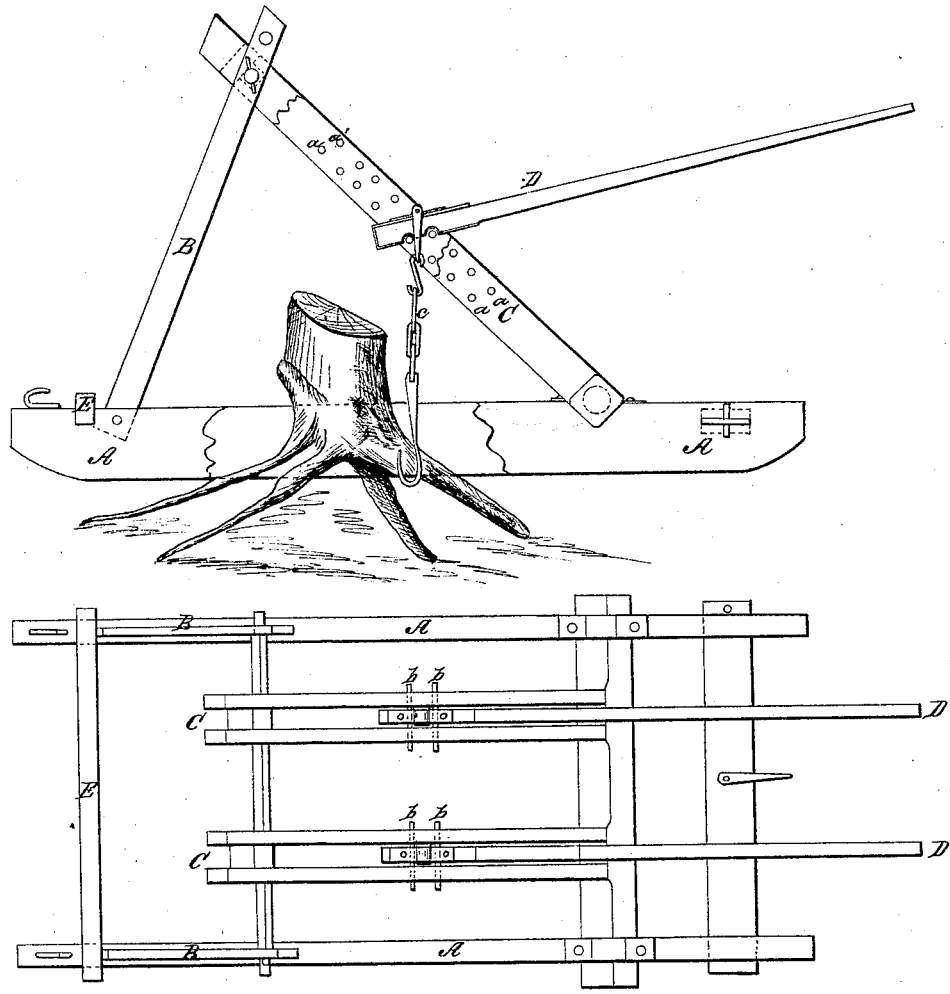

DAVID STAUFFER, OF SPRING HILLS, OHIO.

Letters Patent No. 61,110, dated January 8, 1867.

---

IMPROVEMENT IN STUMP EXTRACTOR.

---

*The Schedule referred to in these Letters Patent and making part of the same.*

---

TO ALL WHOM IT MAY CONCERN:

Be it known that I, DAVID STAUFFER, of Spring Hills, Champaign county, State of Ohio, have invented a new and improved Stump Extractor; and I do hereby declare that the following is a full, clear, and exact description thereof, which will enable others skilled in the art to make and use the same, reference being had to the accompanying drawing, forming part of this specification, in which—

Figure 1 is a side elevation of the machine partly broken out to show its application to a stump.

Figure 2 is a plan.

Similar letters of reference indicate like parts.

The nature of this invention consists in constructing a cheap and powerful machine, which any mechanic or farmer can make, for extracting stumps vertically from the ground by means of long and strong double hand-levers, with a very short adjustable purchase, the levers being so arranged as to loosen and raise the stump gradually, both by depressing and lifting with alternate changes of the fulcrum in two sets or rows of holes. The machine sets over and straddles the stump and does not require an anchor, the ground underneath being the resisting point to the force applied for drawing out the stump. The principle of lifting or working vertically with a succession of short purchases by double levers to operate on both sides of the stump at the same time is the distinguishing feature of the machine.

A A are two bed-pieces or strong timbers like sled-runners, on which the machine is mounted, and by which it is drawn from place to place. Upon them are set a gallows or inverted V-frame, constructed on one side of single timbers B B, and on the other of double timbers C C, between which work the levers D D. In the frames C C are two rows of holes, $a$ and $a'$ for receiving bolts $b\ b$. On the short arms of the levers are hung chains or hook rods $c\ c$ to clevises. On the front end of the machine the cross-bar E is made to fit upon the runners A A, so that it can be taken off and replaced readily.

When operated, the machine is drawn astraddle of the stump, the cross-bar E being removed for the purpose. The chains or hooks are then fastened about the roots of the stump, and under the short arms of the levers are placed bolts $b\ b$, through the lowest holes, $a\ a'$, at which the work of drawing the stumps can be started. The bolt $b$, under a lever placed in the hole $a'$, for example, becomes the fulcrum of one of the levers D by bearing down upon it. When the first purchase taken is exhausted another bolt is then put in the hole $a$ on the other side of the chain or hook rod $c$, and it becomes the fulcrum on which the lever is then raised to perform the work. Thus the machine is operated by alternately moving the fulcrum before and behind the chain by changing the bolts $b\ b$ in the holes $a\ a'$, and reversing the action of the lever. This is done simultaneously with both levers on both sides of the stump, which is thus by easy but powerful purchases gradually drawn from the ground as the levers climb up the frames C C on the bolts $b\ b$, placed alternately in the holes $a\ a'$.

Having thus described the construction and operation of my invention, what I claim as new, and desire to secure by Letters Patent, is—

The inverted frame B B and C C, set upon runners A A, combined with the levers D D working in C C, and operated by moving the fulcrum bolts $b\ b$ in the holes $a\ a'$, and alternately lifting and depressing the levers for the gradual extraction of stumps, constructed and arranged to work substantially as herein described.

DAVID STAUFFER.

Witnesses:
BENJAMIN DAVIS,
RUDOLPH FORRY.